United States Patent
Gadag et al.

(10) Patent No.: US 12,022,348 B2
(45) Date of Patent: Jun. 25, 2024

(54) SYSTEM AND METHOD FOR CALL SELECTION AND MIGRATION IN NG-CU OVER NGRAN

(71) Applicant: Samsung Electronics Co., Ltd., Suwon-si (KR)

(72) Inventors: Veerabhadrappa Murigeppa Gadag, Bengaluru (IN); Lavanya Suresh, Bengaluru (IN); Karthikeyan Subramaniam, Bengaluru (IN); Abhishek V Joshi, Rajasthan (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 17/283,943

(22) PCT Filed: Oct. 14, 2019

(86) PCT No.: PCT/KR2019/013441
§ 371 (c)(1),
(2) Date: Apr. 8, 2021

(87) PCT Pub. No.: WO2020/076140
PCT Pub. Date: Apr. 16, 2020

(65) Prior Publication Data
US 2021/0400554 A1 Dec. 23, 2021

(30) Foreign Application Priority Data
Oct. 12, 2018 (IN) .............................. 201841038769
Oct. 10, 2019 (IN) .............................. 201841038769

(51) Int. Cl.
*H04W 36/22* (2009.01)
*H04W 28/08* (2023.01)
(Continued)

(52) U.S. Cl.
CPC ........... *H04W 36/22* (2013.01); *H04W 28/08* (2013.01); *H04W 76/22* (2018.02); *H04W 88/085* (2013.01); *H04W 88/14* (2013.01)

(58) Field of Classification Search
CPC ..... H04W 36/22; H04W 76/22; H04W 28/08; H04W 88/085; H04W 88/14
(Continued)

(56) References Cited

U.S. PATENT DOCUMENTS 8,830,844 B2  9/2014 Mathias et al.
10,063,633 B1  8/2018 Felstaine et al.
(Continued)

FOREIGN PATENT DOCUMENTS

CN  104365152 A  2/2015
CN  105634780 A  6/2016
(Continued)

OTHER PUBLICATIONS

European Patent Office, "Supplementary European Search Report" dated Oct. 21, 2021, in connection with European Patent Application No. No. 19871301.8, 10 pages.
(Continued)

*Primary Examiner* — Nghi H Ly

(57) ABSTRACT

A system and method for call selection and migration in a NG-CU over NGRAN is disclosed. The system and method comprises a CP VNFC assigning a call initiated by a user to a source user plane VNFC. A management VNFC detects an overload traffic condition upon receiving the assigned call by the source user plane VNFC from the CP VNFC. The source user plane VNFC selects the call to be migrated with a higher migration preference value to another VNFC and signals CP VNFC to initiate call migration. The CP VNFC then migrates the selected call through at least one GTP tunnel to a target user plane VNFC. The source user plane
(Continued)

VNFC then forwards the target user plane VNFC a request to handle complete trafficking of the migrated call.

16 Claims, 10 Drawing Sheets

(51) Int. Cl.
*H04W 76/22* (2018.01)
*H04W 88/08* (2009.01)
*H04W 88/14* (2009.01)

(58) Field of Classification Search
USPC ....... 370/331, 328, 329, 338, 341, 345, 450; 455/436, 442
See application file for complete search history.

(56) References Cited

U.S. PATENT DOCUMENTS

| | | | |
|---|---|---|---|
| 10,306,068 B1* | 5/2019 | Chadha | H04M 3/5234 |
| 2005/0233753 A1* | 10/2005 | Hamabe | H04W 36/06 |
| | | | 455/436 |
| 2014/0066050 A1* | 3/2014 | Kotecha | H04W 72/51 |
| | | | 455/422.1 |
| 2015/0257159 A1 | 9/2015 | Speicher et al. | |
| 2017/0367039 A1 | 12/2017 | Peng | |
| 2018/0026911 A1 | 1/2018 | Anholt et al. | |
| 2018/0295065 A1 | 10/2018 | Adams et al. | |

FOREIGN PATENT DOCUMENTS

| | | |
|---|---|---|
| CN | 107404441 A | 11/2017 |
| CN | 108377205 A | 8/2018 |
| KR | 10-1767472 B1 | 8/2017 |
| WO | 2016071736 A1 | 5/2016 |
| WO | 2017071834 A1 | 5/2017 |

OTHER PUBLICATIONS

Notification of Transmittal of the International Search Report and the Written Opinion of the International Searching Authority, or the Declaration dated Jan. 16, 2020 in connection with International Patent Application No. PCT/KR2019/013441, 12 pages.

Communication under Rule 71(3) EPC dated Sep. 18, 2023, in connection with European Patent Application No. 19871301.8, 45 pages.

Office Action dated Oct. 20, 2023, in connection with Chinese Patent Application No. 201980067247.6, 19 pages.

\* cited by examiner

[Fig. 1A]
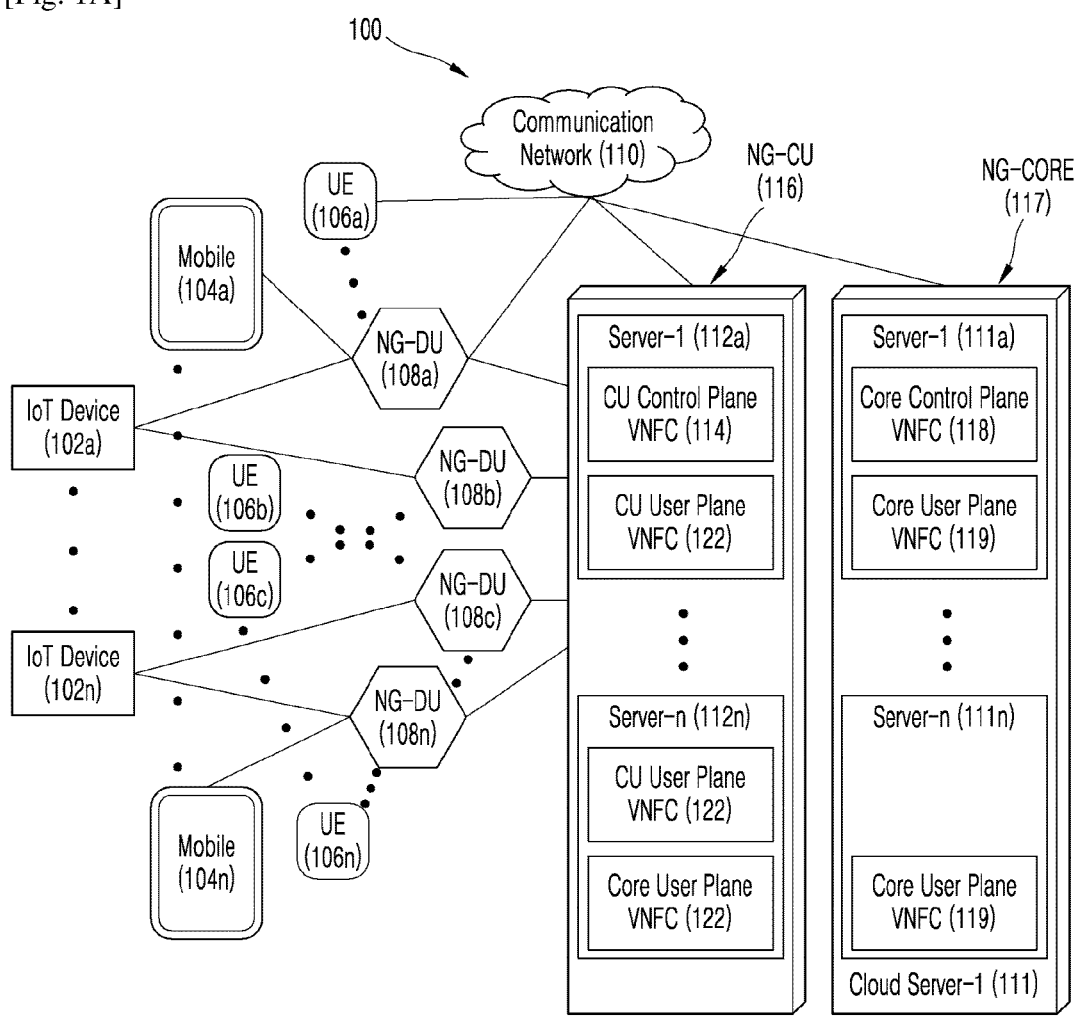
[Fig. 1B]
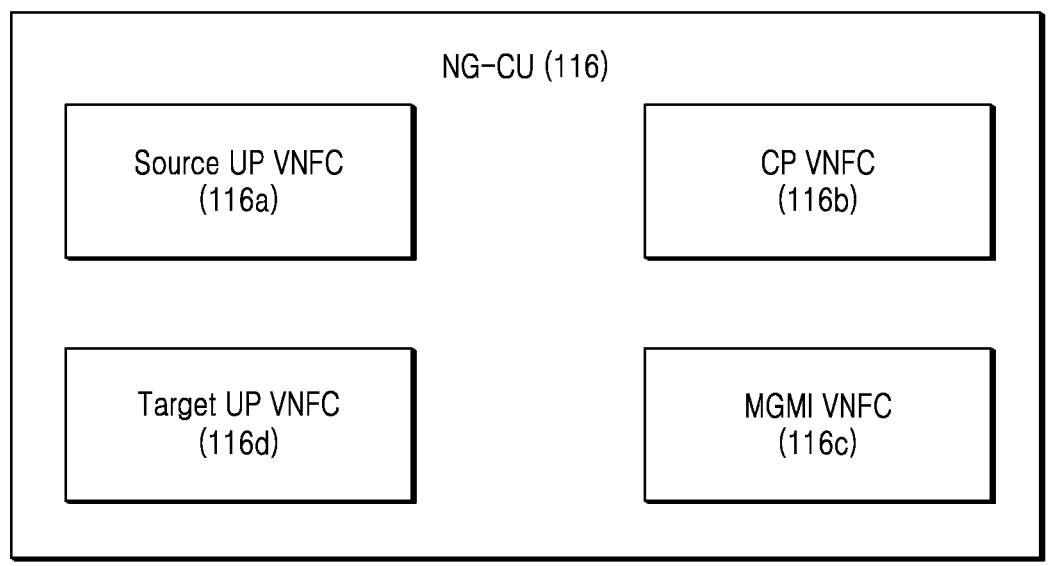

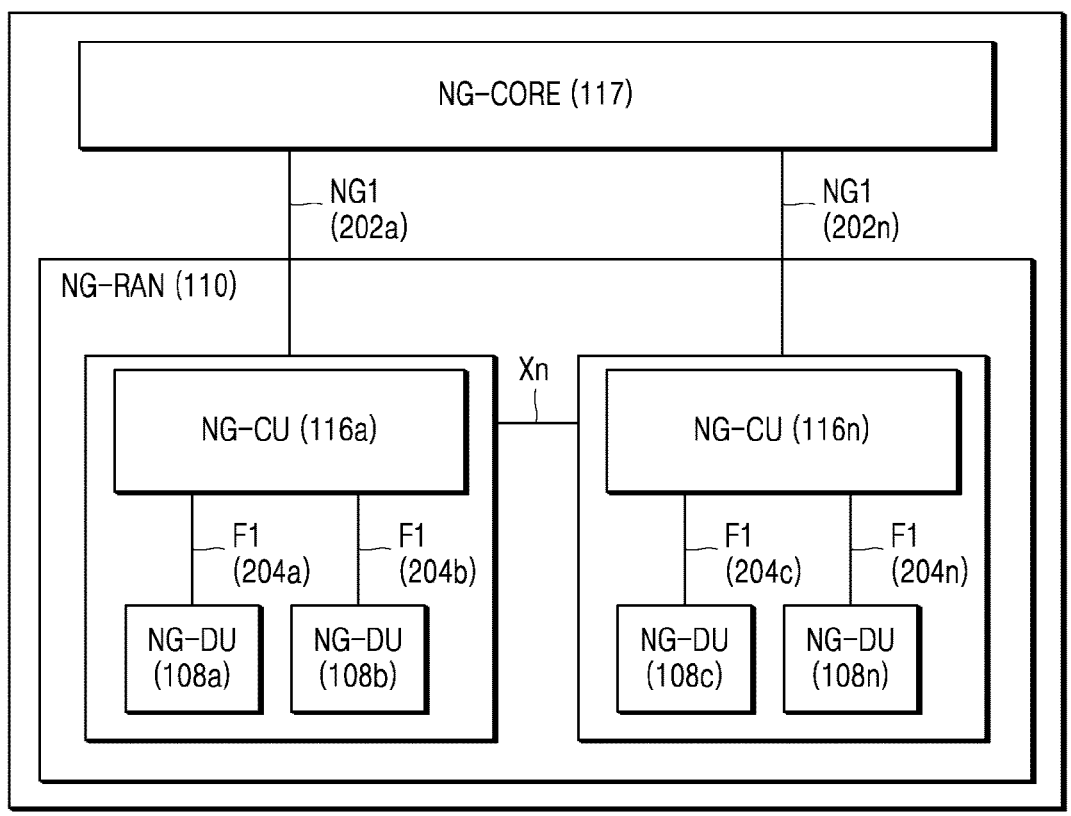
[Fig. 2]
200

[Fig. 3]
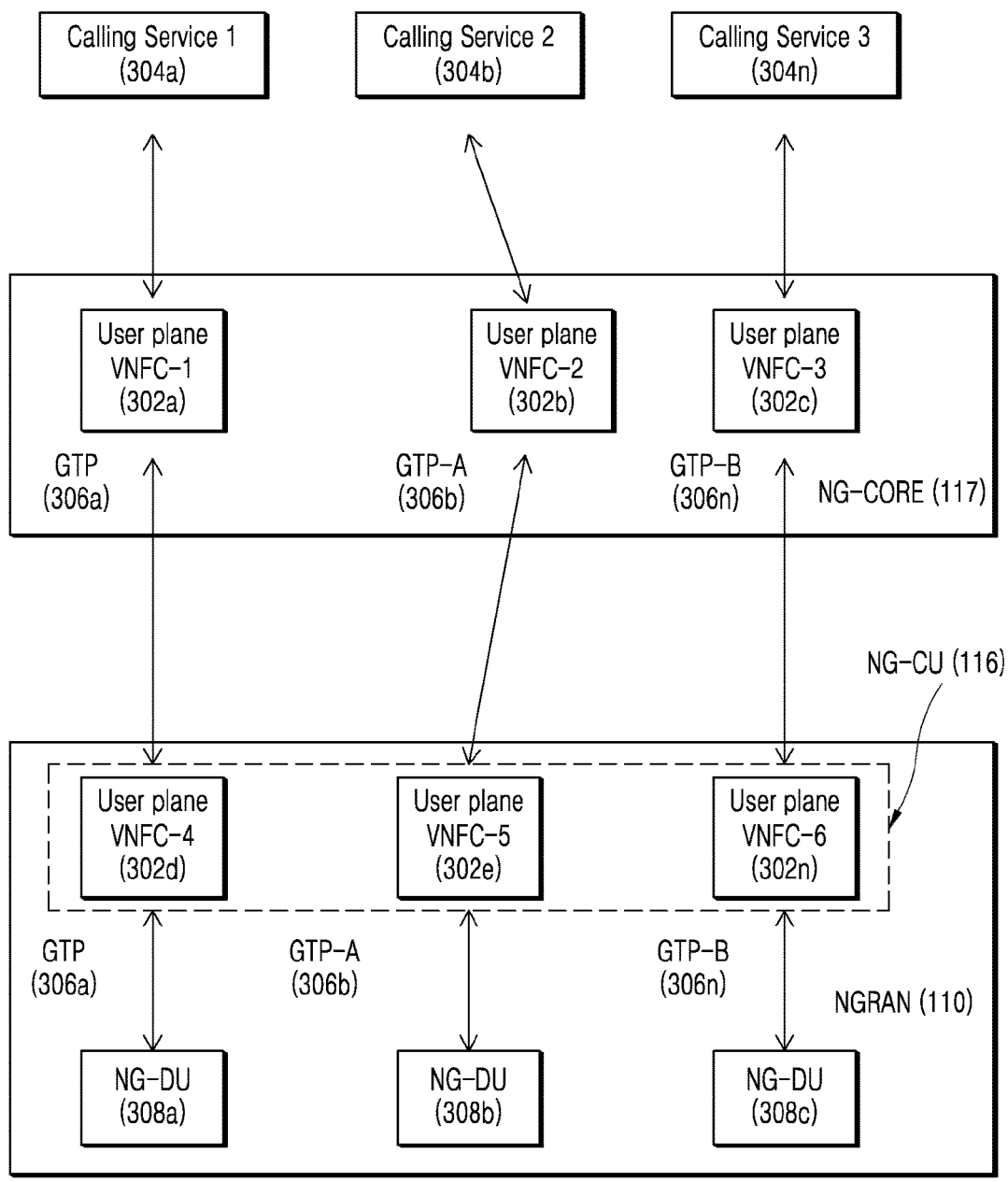

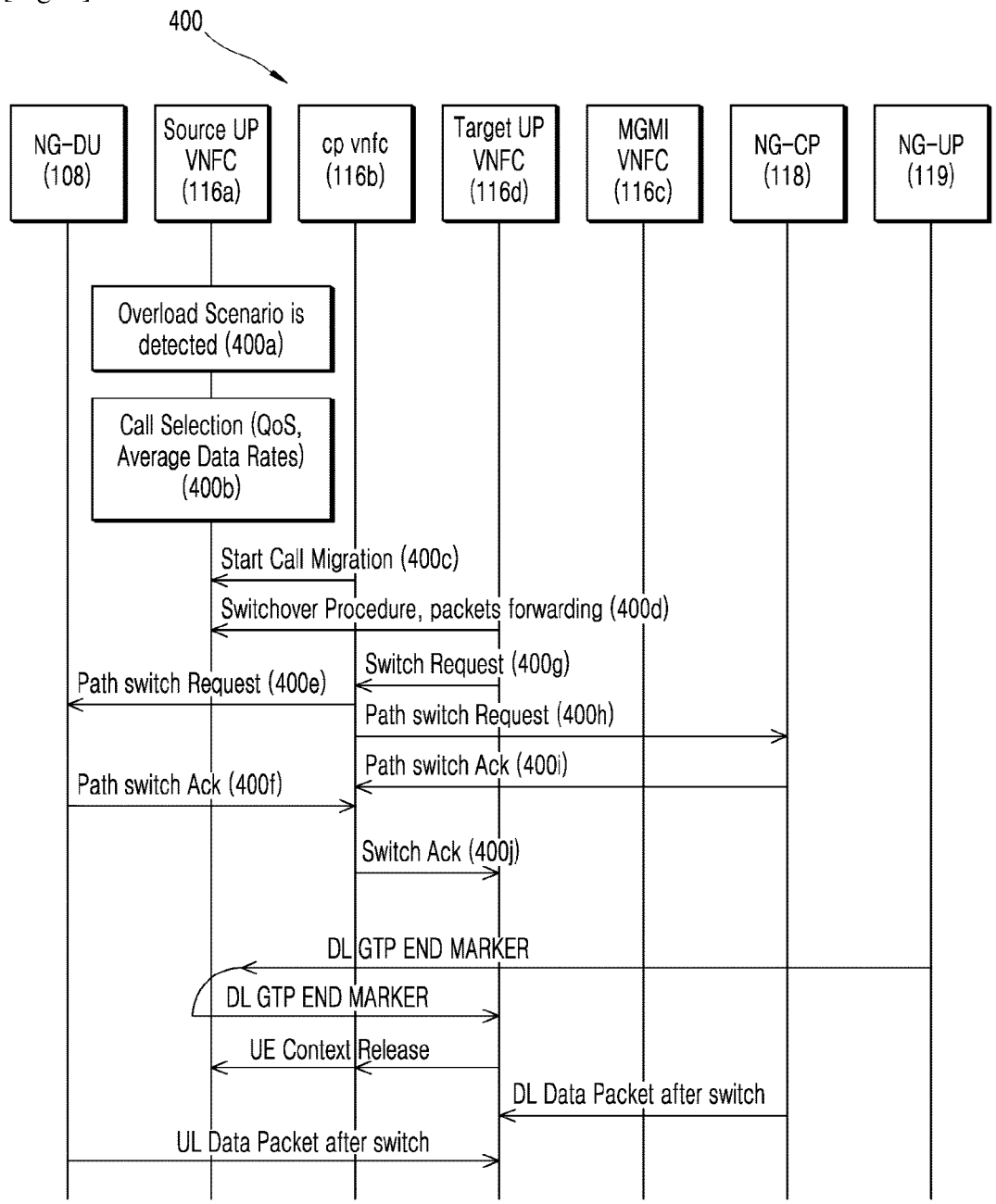

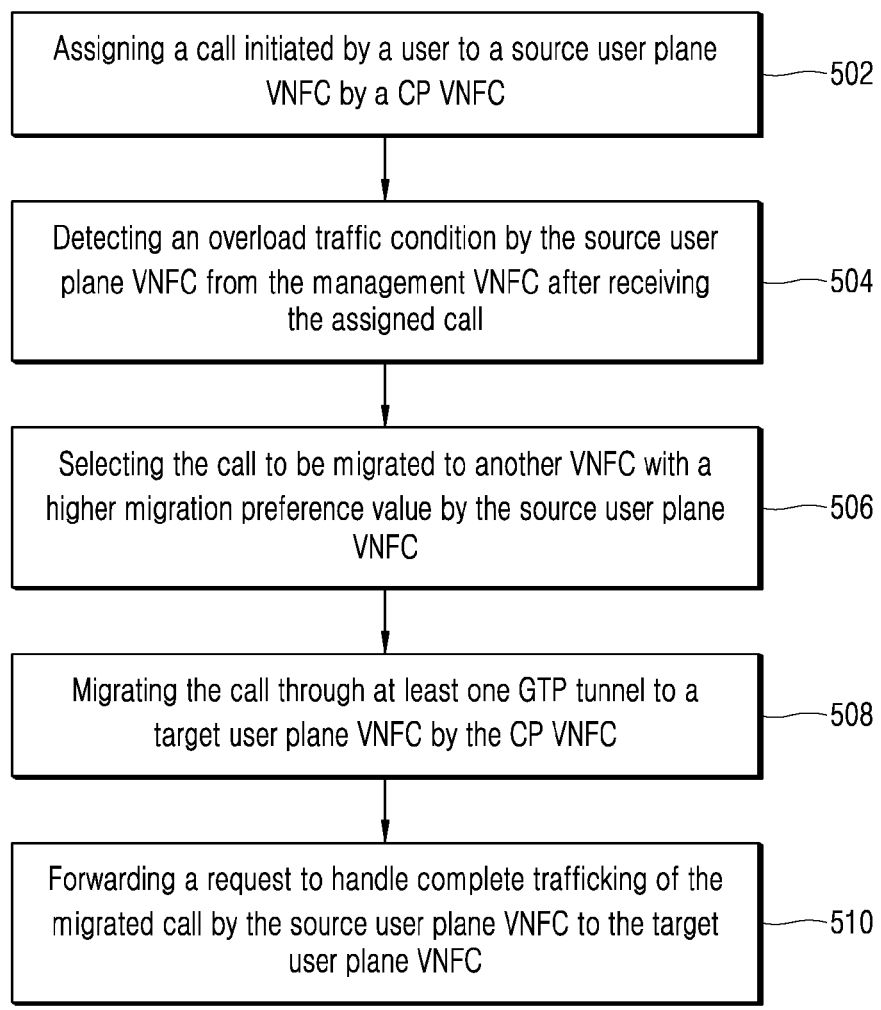

[Fig. 6]
600
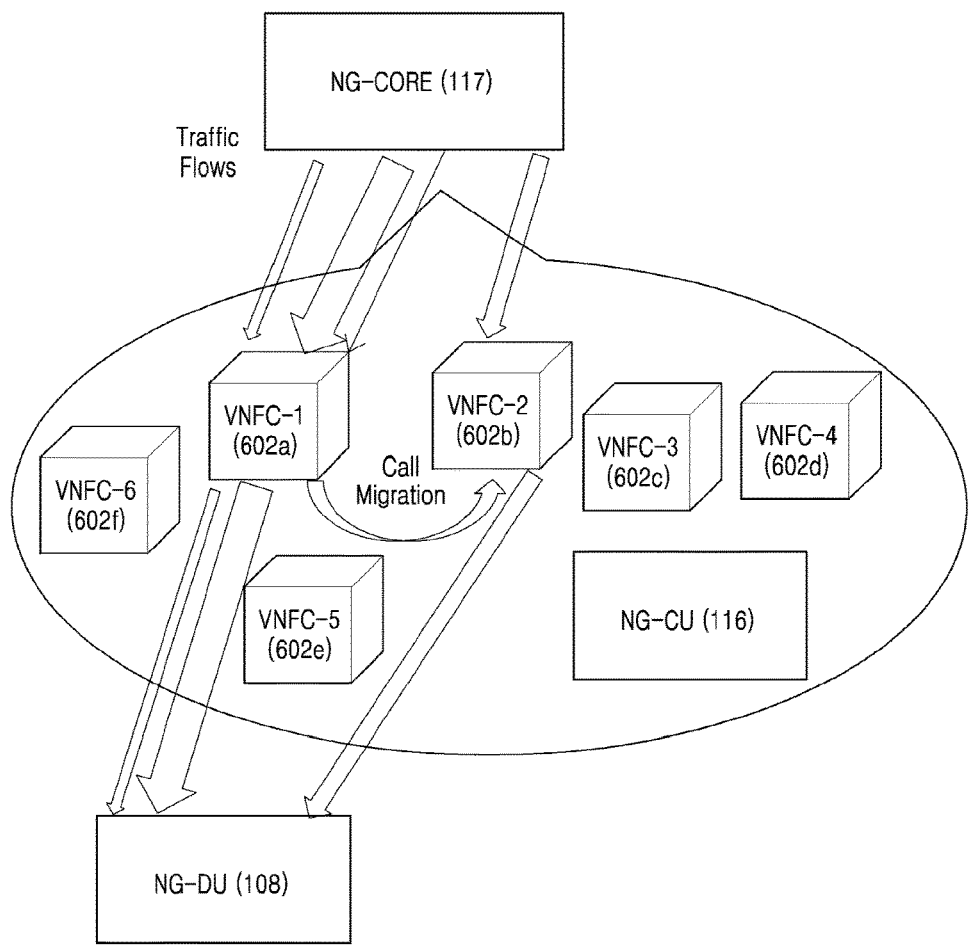
[Fig. 7]
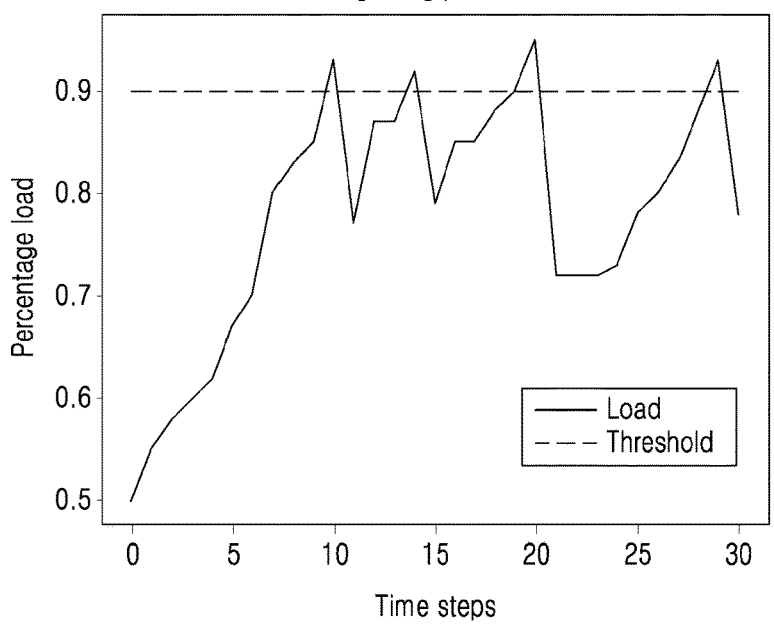

[Fig. 8]
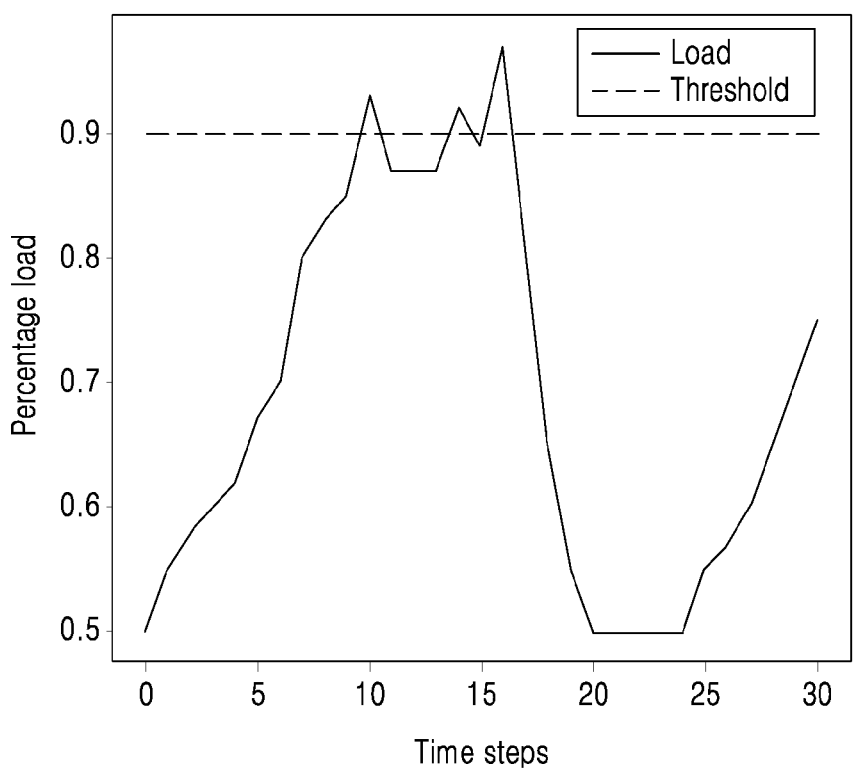
[Fig. 9]
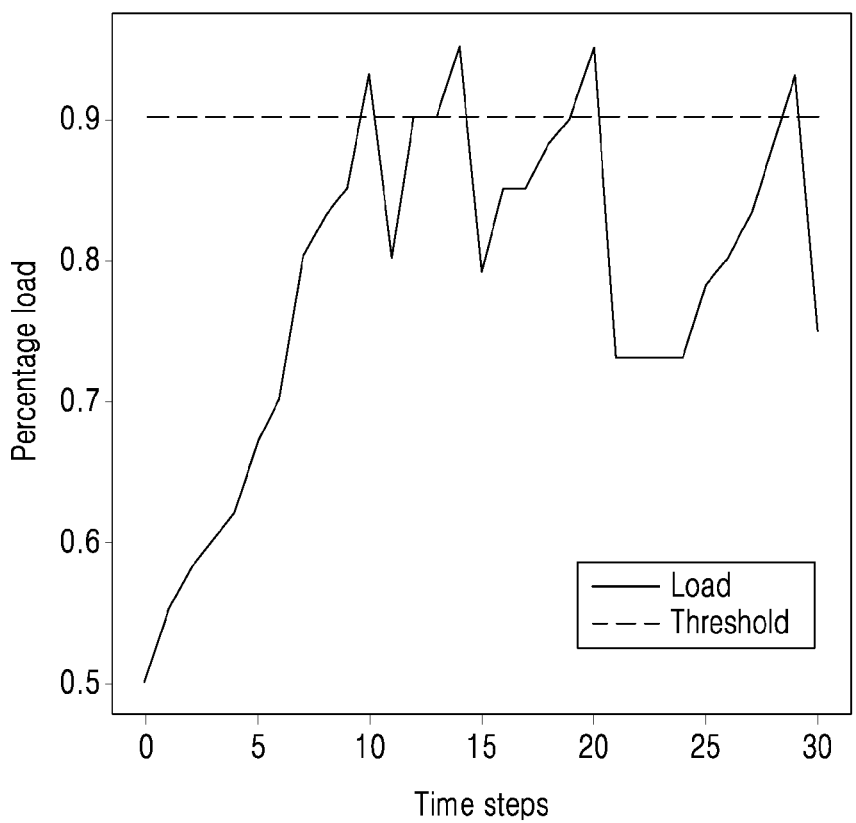

[Fig. 10]
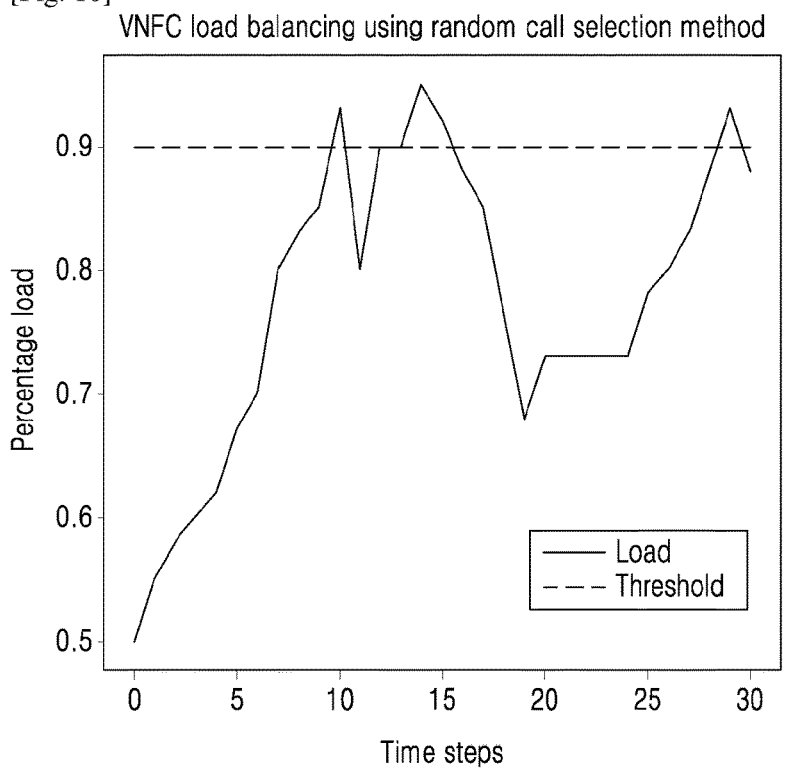
[Fig. 11]
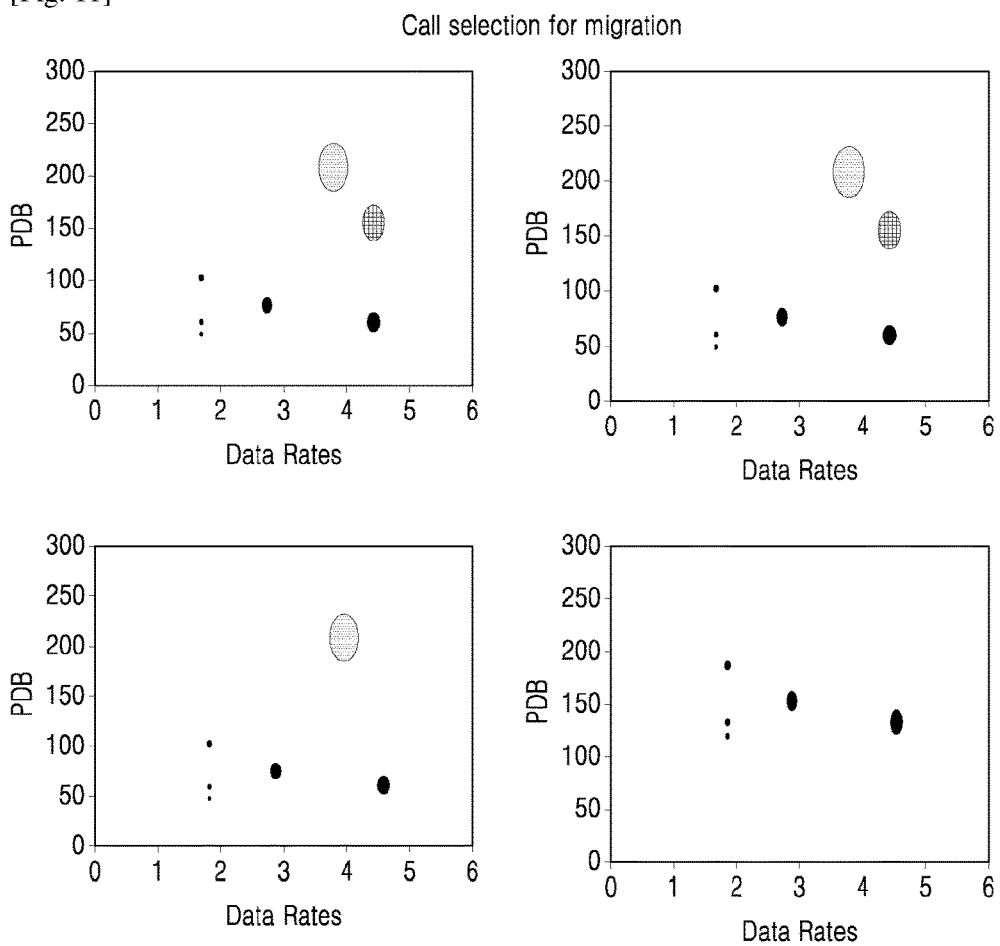

[Fig. 12A]
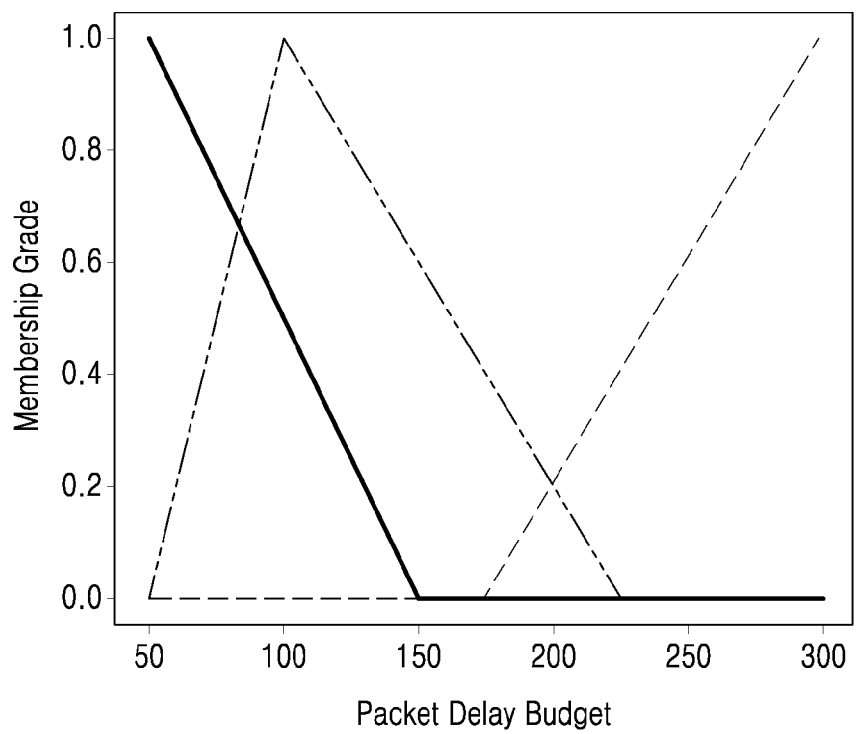
[Fig. 12B]
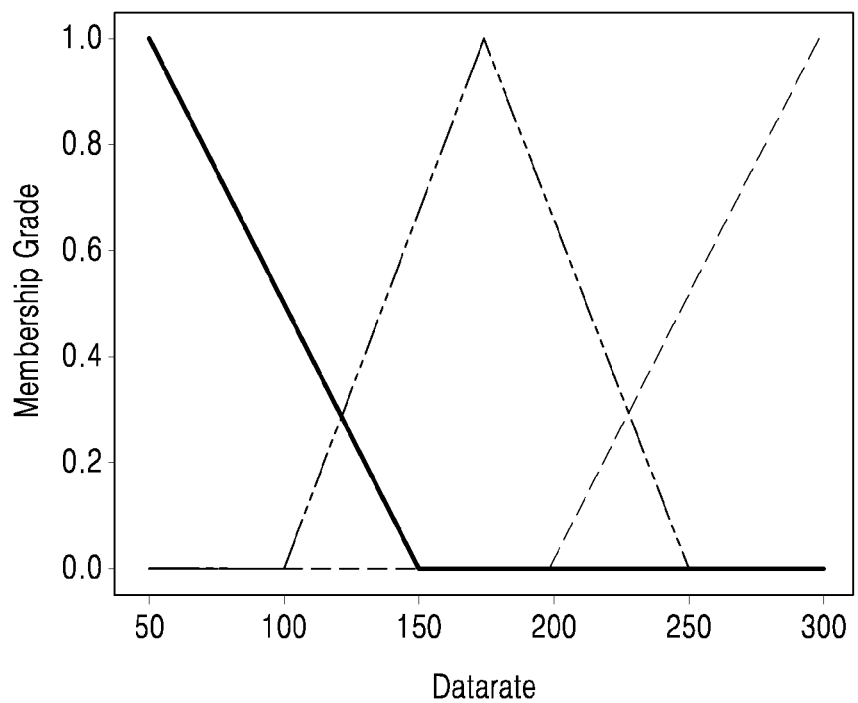

[Fig. 13]
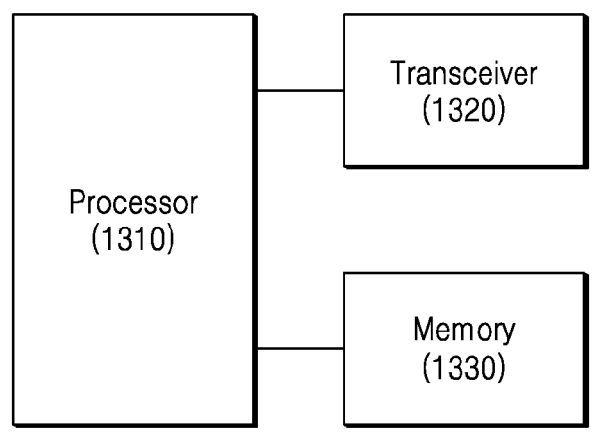
[Fig. 14]
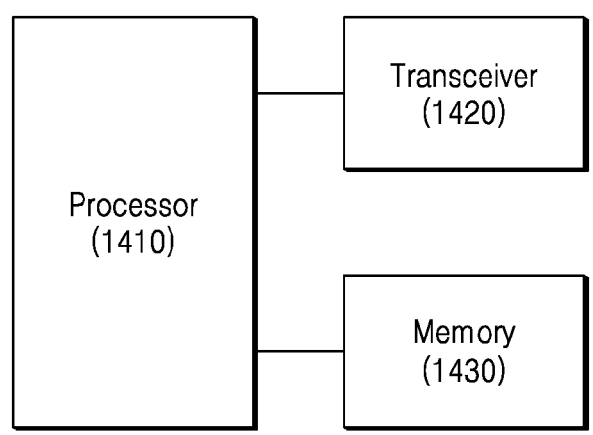

SYSTEM AND METHOD FOR CALL SELECTION AND MIGRATION IN NG-CU OVER NGRAN

CROSS-REFERENCE TO RELATED APPLICATIONS

This application is a 371 of International Application No. PCT/KR2019/013441 filed on Oct. 14, 2019, which claims priority to India Patent Application No. 201841038769 filed on Oct. 12, 2018 and India Patent Application No. 201841038769 filed on Oct. 10, 2019, the disclosures of which are herein incorporated by reference in their entireties.

BACKGROUND

1. Field

The present disclosure relates to the field of call service selection and migration techniques, and is more specifically related to a system and method for call service selection and migration in a NG-CU (Next Generation Central Unit) over NGRAN (Next Generation Radio Access Networks).

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

According to some embodiments of the present inventive concepts, a method for call selection and migration in a NG-CU over NGRAN is claimed which includes first step involving assigning a call initiated by a user to a source user plane VNFC using a CP (Control Plane) VNFC of a plurality of CU (Central Unit) user plane VNFCs (Virtual Network Function Components) in the NG-CU. An overload traffic condition is detected by a management VNFC upon receiving the assigned call by a source user plane VNFC from the CP VNFC in the NG-CU at the second step. The third step involves selection of the call with a higher migration preference value by the source user plane VNFC to another VNFC in the NG-CU. The source user plane VNFC requests a control plane VNFC in the NG-CU to initiate migration of the call based on the migration preference value. The fourth step involves migrating the call by the CP VNFC through at least one GTP (GPRS Tunneling Protocol) tunnel of a plurality of GTP tunnels to a target user plane VNFC of the NG-CU upon acceptance of request by the source user plane VNFC. Finally, the last fifth step involves forwarding by the source user plane VNFC a request to handle complete trafficking of the migrated call to the target user plane VNFC of the NG-CU.

BRIEF DESCRIPTION OF THE DRAWINGS

The inventive concepts are illustrated in the accompanying drawings, throughout which like reference letters indicate corresponding parts in the various figures. The embodiments herein will be better understood from the following description with reference to the drawings, in which:

FIG. 1A illustrates a system for call selection and migration in a NG-CU over NGRAN, according to the embodiments as disclosed herein;

FIG. 1B illustrates hardware components of a NGCU for call selection and migration, according to the embodiments as disclosed herein;

FIG. 2 illustrates NGRAN architecture including the logical nodes and interfaces, according to the embodiments as disclosed herein;

FIG. 3 illustrates an example embodiment of a system for management of call bearers implemented using GTP tunnels which in turn use one or more user plane VNFCs per network type, according to the embodiments as disclosed herein;

FIG. 4 illustrates a sequential diagram of a system for seamless call context migration using protocol signaling, according to the embodiments as disclosed herein;

FIG. 5 illustrates a block diagram of a method for call selection and migration in a NG-CU over NGRAN, according to the embodiments as disclosed herein;

FIG. 6 illustrates an example embodiment of a method for seamless call context migration using protocol signaling in a NG-CU over NGRAN, according to the embodiments as disclosed herein;

FIG. 7 illustrates a graphical representation of VNFC load balancing post call selection method for migration, according to the embodiments as disclosed herein;

FIG. 8 illustrates a graphical representation of VNFC load balancing using FIFO (First In First Out) call selection method for migration, according to the embodiments as disclosed herein;

FIG. 9 illustrates a graphical representation of VNFC load balancing using LIFO (Last In First Out) call selection method for migration, according to the embodiments as disclosed herein;

FIG. 10 illustrates a graphical representation of VNFC load balancing using random call selection method for migration, according to the embodiments as disclosed herein;

FIG. 11 illustrates a graphical representation of call selection for migration, according to the embodiments as disclosed herein;

FIG. 12A illustrates a graphical representation of membership grades for PDB, according to the embodiments as disclosed herein; and FIG. 12B illustrates a graphical representation of membership grades for data rate, according to the embodiments as disclosed herein.

FIG. 13 illustrates a Entity according to embodiments of the present disclosure.

FIG. 14 illustrates a user equipment (UE) according to embodiments of the present disclosure.

DETAILED DESCRIPTION

According to some embodiments of the present inventive concepts, a method for call selection and migration in a NG-CU over NGRAN is claimed which includes first step involving assigning a call initiated by a user to a source user plane VNFC using a CP (Control Plane) VNFC of a plurality of CU (Central Unit) user plane VNFCs (Virtual Network Function Components) in the NG-CU. An overload traffic condition is detected by a management VNFC upon receiving the assigned call by a source user plane VNFC from the CP VNFC in the NG-CU at the second step. The third step involves selection of the call with a higher migration preference value by the source user plane VNFC to another VNFC in the NG-CU. The source user plane VNFC requests a control plane VNFC in the NG-CU to initiate migration of the call based on the migration preference value. The fourth step involves migrating the call by the CP VNFC through at least one GTP (GPRS Tunneling Protocol) tunnel of a plurality of GTP tunnels to a target user plane VNFC of the NG-CU upon acceptance of request by the source user plane VNFC. Finally, the last fifth step involves forwarding by the source user plane VNFC a request to handle complete trafficking of the migrated call to the target user plane VNFC of the NG-CU.

According to some embodiments of the present inventive concepts, a method for intelligent call selection in a NG-CU based on call selection parameters is claimed which includes selection of the call to be migrated to another VNFC with a higher migration preference value by the source user plane VNFC. The call is composed of signaling radio bearers and data radio bearers which in turn have multiple flows with different QoS requirements. This selection of the call to be migrated to another VNFC with a higher migration preference value by the source user plane VNFC further comprises identifying, the value of a QoS Flow Id in a SDAP (Service Data Adaptation Protocol) header, generating, a dynamic priority list of the calls based on QoS Flow ID value corresponding to each QoS and selecting the call with high migration preference and least effect on overall QoE (Quality of Experience). This high migration preference value is dependent on the PDB (Packet Delay Budget) value and the data rate associated with the call. The selection of call with high migration preference value is dependent on the QoS flows and the average data rate of QoS flows. Each class of QoS associates service requests with a value of PDB. QoS Flows associated with a higher PDB will have more tolerance with respect to QoE.

According to some embodiments of the present inventive concepts, the PDB values which indicates QoS flows are fixed for every call.

According to some embodiments of the present inventive concepts, the average data rate is exponential moving and is aggregate of the data rates of all QoS flows.

According to some embodiments of the present inventive concepts, a system for call selection and migration in a NG-CU over NGRAN is claimed. The system comprises of a plurality of IoT (Internet of Things) devices, a plurality of user equipments, a plurality of NG-DUs (Next Generation Distribution Units) connected wirelessly to the IoT device and the plurality of user equipments, a plurality of network accessible servers in the NG-CU connected to the plurality of NG-DUs through a plurality of GTP tunnels. These network accessible servers are configured to assign the call initiated by a user to a source user plane VNFC, by a control plane VNFC of a plurality of CU user plane VNFCs, detect, an overload traffic condition, by a management VNFC upon receiving the assigned call by a source user plane VNFC from the CP VNFC in the NG-CU, select the call to be migrated to another VNFC of the plurality of CU user plane VNFCs with a higher migration preference value, by the source user plane VNFC, request to a control plane VNFC call migration initiation, by the source user plane VNFC based on the migration preference value, migrate the call through at least one GTP tunnel of the plurality of GTP tunnels in the NG-CU, by the control plane VNFC to a target user plane VNFC upon acceptance of request by the source user plane VNFC and forward a request to the target user plane VNFC to handle complete trafficking of the migrated call, by the source user plane VNFC.

According to some embodiments of the present inventive concepts, migrating the call through at least one GTP tunnel of the plurality of GTP tunnels in the NG-CU by the control plane VNFC may involve tearing down of the plurality of GTP tunnels, from one VNFC and reestablishment of the plurality of GTP tunnels on another VNFC.

According to some embodiments of the present inventive concepts, the selected calls can be migrated by the control plane VNFC to the existing VNFCs or to new VNFCs depending upon whether these selected calls can be accommodated.

According to some embodiments of the present inventive concepts, each VNFC may process multiple calls at a time.

According to some embodiments of the present inventive concepts, each VNFC of the NG-CU has a finite service capability, up to which it supports packet processing with negligible or no latency.

According to some embodiments of the present inventive concepts, service requirement for each call may vary dynamically.

According to some embodiments of the present inventive concepts, the migration preference value may be a function of two input parameters namely the average data rate and PDB (Packet Delay Budget).

According to some embodiments of the present inventive concepts, a system for seamless call context migration using protocol signaling is claimed which includes a control plane VNFC assigning a call initiated by a user to a source user plane VNFC. The management VNFC detects an overload traffic condition upon receiving the assigned call by a source user plane VNFC from the CP VNFC in the NG-CU. The source user plane VNFC selects the call to be migrated with a higher migration preference value to another VNFC and request a control plane VNFC to initiate migration of the call based on the migration preference value. The control plane VNFC migrates the call through at least one GTP tunnel of a plurality of GTP tunnels to a target user plane VNFC upon acceptance of request by the source user plane VNFC. Lastly the source user plane VNFC forwards to the target user plane VNFC a request to handle complete trafficking of the migrated call.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. As used herein, the term "and/or" includes any and all combinations of one or more of the associated listed items. Expressions such as "at least one of," when preceding a list of elements, modify the entire list of elements and do not modify the individual elements of the list. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by electronic devices such as mobile, laptop, mini-tablets, or the like, and may optionally be driven by firmware and software. The modules may, for example, be embodied in one or more electronic devices, or on any other communication devices and the like. The modules constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Like numbers refer to like elements throughout. Thus, the same or similar numbers may be described with reference to other drawings even if they are neither mentioned nor described in the corresponding drawing. Also, elements that are not denoted by reference numbers may be described with reference to other drawings. Although the terms first, second, etc. may be used herein to describe various elements, these elements should not be limited by these terms. These terms are generally only used to distinguish one element from another.

The NGRAN represents the newly defined radio access network for 5G (5th Generation). NGRAN provides both NR (New Radio) and LTE (Long Term Evolution) radio access. An NGRAN node is either: a gNB (g-Node B), providing NR user plane and control plane services or an NG-eNB (Next Generation e-Node B), providing LTE services towards the UE (User Equipment). One of the distinctive features of NGRAN is the capability to operate in both so-called "Stand-Alone" (SA) operation and "Non-Stand-Alone" (NSA) operation. In SA operation, the gNB is connected to the 5G Core Network (5GC); in NSA operation, NR and LTE are tightly integrated and connect to the existing 4G (4th Generation) Core Network, leveraging Dual Connectivity (DC) toward the terminal.

Many conventional systems and methods have been proposed for selection and migration of call service using GTP (GPRS Tunneling Protocol) tunnels in a NGRAN. The conventional system and method introduced a GTP Arbitrator in NGRAN architecture. GTP tunnels towards NG-DU (Next Generation Distribution Unit) (F1-U) and NG-Core (Next Generation-Core Network) are terminated at GTP Arbitrator rather than at each UP VNFC (User Plane Virtual Network Function Component). GTP Arbitrator can be realized from one of the VNFC in NG-CU (Next Generation Central Unit) DU cloud. This GTP Arbitrator VNFC cannot switch processing of the bearer traffic transparently to new VNFC having an impact on existing GTP tunnels. So the tunnels need to be re-established if the call context moves across user plane VNFCs during load balancing or user plane scaling.

In NG-CU, each call is assigned to a specific VNFC to maintain ordering of packets, call context etc. Every VNFC in NG-CU has a finite service capability, up to which it supports packet processing with negligible or no latency. When VNFC is overloaded delay in packet processing, packet drop, jitters are expected. It ultimately affects the end user experience. In order to avoid degradation of end user experience some calls have to be migrated to other VNFC.

The above mentioned systems and methods are not efficient as they are unable to perform selection and migration of calls within a plurality of VNFCs during an overload condition.

Thus, it is desired to address the above mentioned disadvantages or other shortcomings by providing a dedicated, thoroughly designed and efficient system and method for selecting and migrating calls in a NG-CU over NGRAN during an overload condition or at least provide a useful alternative. Accordingly, embodiments herein disclose a system and method for call selection and migration in a NG-CU over NGRAN. The proposed method includes selecting and migrating a call in a NG-CU comprising assignment of a call initiated by a user to a source user plane VNFC using a control plane VNFC as the initial step. A management VNFC then detects an overload traffic condition upon receiving the assigned call by a source user plane VNFC from the CP VNFC in the NG-CU from the control plane VNFC at the second step. The source user plane VNFC selects the call to be migrated with a higher migration preference value to another VNFC at the third step. The source user plane VNFC requests a control plane VNFC to initiate migration of the call based on the migration preference value. The control plane VNFC then migrates the call through at least one GTP tunnel of a plurality of GTP tunnels to a target user plane VNFC upon acceptance of request by the source user plane VNFC at the fourth step. Lastly the fifth step involves the source user plane VNFC forwarding the target user plane VNFC a request to handle complete trafficking of the migrated call.

Unlike conventional systems, the proposed system utilizes migration of calls from one VNFC to another VNFC in a NG-CU over NGRAN to avoid degradation of end user experience and using both QoS parameter and the mean data rate of QoS flows associated with each calls to achieve minimized service latency in NGRANs. To ensure that the end user experience is not compromised due to the added latency of migration, call selection is done intelligently such that PDB requirements of calls are not violated. Two parameters which affect the end user experience and the migration latency have been identified as QoS and the associated data rate. QoS and data rate are used to compute the migration preferences of existing QoS flows. The migration preference of a call refers to aggregation of migration preference of all QoS flows associated with it. The call with higher preference value shall be selected for migration before the call with a comparatively lower value.

In the proposed system and method, the efficient use of GTP signaling helps in ensuring migration of the selected calls either to the existing pool of VNFCs or to new VNFCs depending upon whether they can be accommodated. The proposed system reduces the migration latency problem by assigning the migration preference value to calls based on QoS flows with a higher PDB having more tolerance with respect to QoE resulting in better overall QoE which is way lesser than traditional approach.

The principal object of the embodiments herein is to provide a method for call selection and migration in a NG-CU over NGRAN.

Another object of the embodiments herein is to determine a method for seamless call context migration using protocol signaling from one VNFC (Virtual Network Function Component) to another VNFC in a NG-CU over NGRAN.

Another object of the embodiments herein is to provide a method for intelligent call selection in a NG-CU based on call selection parameters.

Another object of the embodiments herein is to provide a system for call selection and migration in a NG-CU over NGRAN.

Another object of the embodiments herein is to provide a system for seamless call context migration using protocol signaling.

Referring now to the drawings and more particularly to FIGS. 1A through 14, there are shown embodiments of the inventive concepts.

FIG. 1A is an illustration of a system (100) for call selection and migration in a NG-CU (116) over NGRAN (204), according to the embodiments as disclosed herein. The system (100) comprises of a plurality of IoT devices (102a-102n), a plurality of mobile devices (104a-104n), a plurality of user equipments (106a-106n), a plurality of NG-DUs (108a-108n) connected wirelessly to the plurality of IoT devices (102a-102n) and the plurality of user equipments (106a-106n), a plurality of network accessible servers (112a-112n) in the NG-CU (116) and a plurality of network accessible servers (111a-111n) in the NG-CORE (117), connected to the plurality of NG-DUs (108a-108n) through a plurality of GTP tunnels (not shown). The plurality of network accessible servers (112a-112n) in the NG-CU (116) are configured to assign, by a control plane VNFC (116b), the call initiated by a user to a source user plane VNFC (116a) of a plurality of CU user plane VNFCs (122), detect, an overload traffic condition, by a management VNFC (116c) upon receiving the assigned call by the source user plane VNFC (116a) from the CP VNFC (116b) in the NG-CU, select, the call to be migrated to another VNFC of the plurality of CU user plane VNFCs (122) with a higher migration preference value, by the source user plane VNFC (116a), request, to a control plane VNFC (116b) call migration initiation, by the source user plane VNFC (116a) based on the migration preference value, migrate, the call through at least one GTP tunnel of the plurality of GTP tunnels in the NG-CU (116), by the control plane VNFC (116b) to a target user plane VNFC (116d) upon acceptance of request by the source user plane VNFC (116a) and forward, the target user plane VNFC (116d) a request to handle complete trafficking of the migrated call, by the source user plane VNFC (116a). All these devices are connected to each other wirelessly over a communication network (110) used as a wireless communication network.

The communication network can include a data network such as, but not restricted to, the Internet, local area network (LAN), wide area network (WAN), metropolitan area network (MAN) etc. In certain embodiments, the communication network can include a wireless network, such as, but not restricted to, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS) etc.

FIG. 1B illustrates hardware blocks of a NG-CU (116) for call selection and migration, according to the embodiments as disclosed herein. The NG-CU (116) comprises of a source user plane VNFC (116a), a control plane VNFC (116b), a management VNFC (116c) and a target user plane VNFC (116d). The source user plane VNFC (116a) receives the assigned call from the control plane VNFC (116b) and is involved in selection of the call to be migrated to another VNFC of the plurality of CU user plane VNFCs (122) with a higher migration preference value upon detection of overload condition by the management VNFC (116c) in the assigned call. The control plane VNFC (116b) is configured to perform receiving of a call migration initiation request by the source user plane VNFC (116a) based on the migration preference value. The control plane VNFC (116b) migrates the selected calls to the target user plane VNFC (116d) through at least one GTP tunnel of a plurality of GTP tunnels in the NG-CU (116) upon acceptance of request by the source user plane VNFC (116a). The target user plane VNFC (116d) then handles the request for complete trafficking of the migrated call by the source user plane VNFC (116a).

FIG. 2 illustrates NGRAN (110) architecture (200) including the logical nodes and interfaces, according to the embodiments as disclosed herein. As depicted, there are two interfaces in the NGRAN architecture (200) namely NG1 (Next Generation 1) interfaces (202a-202n) and F1 interfaces (204a-204n). As shown, the plurality of F1 interfaces (204a-204n) connects plurality of NG-CUs (116a-116n) and plurality of NG-DUs (108a-108n). Over plurality of F1 interfaces (204a-204n), GTP-U tunnels are established upon bearer service request. These GTP-U tunnels are terminated at NG-CU (116). Similarly, plurality of NG1 interfaces (202a-202n) connects the NG-CU (116) with NG-CORE (117) and there will be a GTP tunnel between them for each bearer. Call migration procedure involves tearing down of GTP-U tunnels, on both plurality of F1-U interfaces (204a-204n) and plurality of NG1-U interfaces (202a-202n) from one VNFC and re-establishment of the same on another VNFC.

FIG. 3 illustrates an example embodiment of a system (300) involving management of call bearers implemented using GTP tunnels (306a-306n) which in turn use a plurality of user plane VNFCs (302a-302n) per network type, according to the embodiments as disclosed herein. The user plane VNFCs (302a-302n) are the compute nodes in NG-CU (116). In the NG-CU (116), each call is assigned to a specific VNFC to maintain ordering of packets, call context etc. Every user plane VNFC in the plurality of user plane VNFCs (302a-302n) in the NG-CU (116) has a finite service capability, up to which it supports packet processing with negligible or no latency. Each VNFC can process multiple calls at a time. Service requirement for each call can vary dynamically, leading to overload or underutilization of VNFC resources. In order to avoid this call selection is done intelligently which does not affect the migration latency and have the minimal impact on the QoE for the end user during migration. The system (300) in FIG. 3 shows call selection and particularly call migration to the plurality of user plane VNFCs (302a-302n) through plurality of GTP tunnels namely GTP-a, GTP-n (306a-306n) over NGRAN (110) and NG-CORE (117) networks. A plurality of call services (304a-304n) initiated by the user are migrated to a plurality of user plane VNFCs (302a-302n) through a plurality of GTP tunnels (306a-306n) over NGRAN (110) and NG-CORE networks (117). As an example if for handling a call service (304a), the PDB value of this call and the data rate associated with the QoS flows or this call are calculated and based on this a migration preference value of this call (304a) is calculated. Once the migration preference value is calculated, the call is selected (304a) to be migrated with a higher migration preference value. Let's assume that during migration of the call (304a) with higher migration preference from one user plane VNFC, for e.g., user plane VNFC-1 (302a) to another user plane VNFC, for e.g., user plane VNFC-4 (302d), an overload traffic condition is detected by the user plane VNFC-4 (302d) receiving the call (304a) with a higher migration preference value, then the same call (304a) is migrated to an another user plane VNFC, that is, a user plane VNFC-5 (302e) for handling call migration using GTP signaling as the calls are migrated from one VNFC to another VNFC using the plurality of GTP tunnels (306a-306n). This leads to minimal impact on the QoE for the end user during migration and ensures no effect on migration latency.

In an embodiment, the call migration is achieved using protocol signaling approach, before which intelligent call selection is made. Switchover is triggered between one user plane VNFC and another user plane VNFC in the NG-CU (116). This switchover involves seamless call context migration and path switching of NG1-U interfaces (202a-202n) and F1-U interfaces (204a-204n).

FIG. 4 illustrates a sequential diagram of a system (400) for seamless call context migration using protocol signaling, according to the embodiments as disclosed herein. The system (400) for seamless call context migration using protocol signaling includes a source user plane VNFC (116a), receiving a call initiated by the user, through GTP tunnels by a control plane VNFC (116b). The management VNFC (116c) detects whether there is an overload scenario in the assigned call or not. If the overload scenario is detected at step (400a), call selection is performed by the source user plane VNFC (116a) to migrate the call with a higher migration preference value at step (400b) wherein this migration preference value is an important parameter for deciding call selection. QoS or PDB value and data rate are used to compute the migration preference value of the call. The migration preference of a call refers to aggregation of migration preference of all QoS Flows associated with it. The call with higher migration preference value shall be selected for migration before the call with a comparatively lower value. Once the call selection is achieved, the control plane VNFC (116b) request a source user plane VNFC (116a) to allow call migration initiation, upon which the source user plane VNFC (116a) performs call migration by migrating the selected calls at step (400c) through at least one GTP tunnel of a plurality of GTP tunnels. Due to call migration, a switch over occurs in the form of packets forwarding between the source user plane VNFC (116a) and the target user plane VNFC (116d) at step (400d) wherein the target user plane VNFC (116d) forwards the call in the form of data packets. This switchover involves seamless call context migration and selection between the source user plane VNFC (116a) and the target user plane VNFC (116d), as a result, of which the control plane VNFC (116b) requests call path switching to a NG-DU (108) at step (400e). The NG-DU (108) receives the call path switch request and acknowledges the call path switch request back to the control plane VNFC (116b) at step (400f). The target user plane VNFC (116d) then requests call switching request to the CP VNFC (116b) at step (400g). The CP VNFC (116b) responds back to call switch request and sends the call path switch request to an NG-CP (Next Generation Core Pad) unit (118) at step (400h). The NG-CP unit (118) receives the call path switch request and acknowledges the call path switch request back to the control plane VNFC (116b) at step (400i). The control plane VNFC (116b) after receiving the acknowledgement for acceptance of call path switch request by the NG-CP unit (118) accepts the call path switching and acknowledges it to a target user plane VNFC (116d) at final step (400j) and the complete trafficking of the migrated call is then handled by the source user plane VNFC (116a).

FIG. 5 illustrates a block diagram of a method (500) for call selection and migration in a NG-CU (112) over NGRAN (110), according to the embodiments as disclosed herein. The method (500) for call selection and migration in a NG-CU (112) includes assigning of a call initiated by a user by the control plane VNFC (116b) to a source user plane VNFC (116a) at step (502). An overload traffic condition is then detected by a management VNFC (116c) upon receiving the assigned call by the source user plane VNFC (116a) from the CP VNFC (116b) in the NG-CU at step (504). The call with a higher migration preference value to be migrated to another VNFC from the source user plane VNFC (116a) is then selected by the source user plane VNFC (116a) at step (506). The call migration initiation is requested to control plane VNFC (116b) based on the migration preference value of the call selected by the source user plane VNFC (116a). The call is then migrated through at least one GTP tunnel to a target user plane VNFC (116d) upon acceptance of the request by the control plane VNFC (116b) at step (508). Lastly the target user plane VNFC (116d) while receiving the migrated call handles the complete trafficking of the migrated call upon receiving a request from the source user plane VNFC (116a) at step (510).

Selecting the call with a higher migration preference value by the source user plane VNFC (116a) at step (506) further includes identifying the value of QoS Flow Id in a SDAP (Service Data Adaptation Protocol) header, generating a dynamic priority list of the calls based on QoS Flow ID value corresponding to each QoS, and selecting the call with high migration preference and least effect on overall QoE.

In some embodiments, seamless call context migration and call selection using protocol signaling can be implemented by migrating the call from one VNFC to another VNFC of the NG-CU (116) and the call trafficking of the migrated call to another VNFC may flow from the NG-CORE (117) network to the NG-DU (108) through the NG-CU (116). The migration of the call involves conversational voice or a non-conversational video or an IoT message at a certain rate in gbps.

FIG. 6 illustrates an example embodiment of a method (600) for a seamless call context migration using protocol signaling in a NG-CU (116) over NGRAN (110), according to the embodiments as disclosed herein. The method (500) includes call migration from one VNFC, that is, VNFC-1 (602a) to another VNFC, that is, VNFC-2 (602b) of an NG-CU (116). The three different arrows from one VNFC to NG-DU indicated in the figures represent conversational voice at rate x gbps (Giga bytes per second), IoT messages at rate y gbps and non-conversational video at rate z gbps. These arrows represent migration of the different activities in the form of calling or message to a plurality of different VNFCs (602a-602f) within the NGCU (116). The call trafficking flows from the NG-CORE (117) network to the NG-DU (108) through the NG-CU (116). If one VNFC, for e.g., VNFC-1 (602a) which receives the call initiated by the user detects an overload scenario in the received call, the call is then being migrated to another VNFC, for e.g. VNFC-2 (602b) for migrating the call based on its migration preference value dependent on the PDB value and the data rates associated with that call.

QoS and data rate are used to compute the migration preferences of existing QoS flows. The migration preference of a call refers to aggregation of migration preference of all QoS Flows associated with it. The call with higher preference value shall be selected for migration before the call with a comparatively lower value. Queue size and latency due to bearer migration are modelled as follows, $$Latency_i^{Total} = Time_i^{Migration} + Time_i^{Dequeue} \quad (1)$$

$$QSize^{Total} = \sum_{i=0}^{N} \lambda_i \times Time_i^{Migration} \sum_{i=1}^{N} Q(\lambda_i, \sigma_i) \quad (2)$$

$$Time_i^{Migration} = \left(QSize^{Total} - \sum_{i=1}^{N} Q(\lambda_i, \sigma_i)\right) \Big/ \sum_{i=0}^{N} \lambda_i \quad (3)$$

$$Time_i^{Dequeue} = \phi_i \times \frac{Z_i(u)}{\sum_{i=1}^{N} \phi_i \times Z_i(u)} \times QSize_i \quad (4)$$

where $\lambda_i$ denotes arrival rate of packets from flow $\lambda_i$, and so the aggregate arrival rate is $\sigma_i \Sigma_{i=1}^{N} \lambda_i \cdot \Sigma_{i=1}^{N}(Q(\lambda_i, \sigma_i)$ which gives mean queuing delay with $\lambda_i$ and the virtual service rate $\sigma_i$. $QSize_j$ gives queue size for a single flow j. $Z_i(u)$ denotes whether the packets are queued or not for the flow i. It can be seen that queue size is the sum of data rate times migration latency and buffer needed during de-queueing time, and latency is the time involved in signalling and time required for de-queueing. It is evident from (1) and (2) that data rate play a major role in determining Queue size and latency, which makes it necessary to consider this parameter in call selection. The data rate however a very uncertain parameter is and fluctuates abruptly depending on what the end user is accessing. Migration latency is directly proportional to the size of call context ($QSize_{Total}$). Here, call context refers to the buffer which stores the packets to be processed, and the size of this buffer is dictated by exponential moving average data rate of that call. Hence the migration latency increases with data rate. The compute load exerted on a VNFC by a given call is directly proportional to exponential moving average data rate of the call, which is aggregate of the data rates of all QoS Flows. So it is preferable to choose the calls having QoS flows with higher data rates for migration.

The PDB values which indicates QoS are fixed for every call. It is intuitive that QoS Flows associated with a higher PDB will have more tolerance with respect to QoE. Hence migrating calls with such QoS Flows will result in better overall QoE.

TABLE 1

Preference values with respect to migration parameters

| Migration Parameters | | Data Rate | | |
|---|---|---|---|---|
| | | Low | Medium | High |
| PDB | Low | 1 | 2 | 4 |
| | Medium | 3 | 5 | 7 |
| | High | 6 | 8 | 9 |

Table 1 above captures the presented ideas and assigns migration preference value to calls based upon the linguistic class of parameters. The table also highlights the fact that PDB is the primary parameter for migration. The migration preferences quantify the suitability of a call to be migrated. As shown in the table, if the data rate is low and PDB value is low, the migration preference value is 2, if the data rate is low and PDB value is high, the migration preference value is 4, if the data rate is high and PDB value is low, the migration preference value is 1 and if the data rate is high and PDB value is high, the migration preference value is 3.

The values of migration preference of QoS flow i be $MP_i$ is a function of two input parameters, namely the average data rate ($\lambda_i$) and packet delay Budget (PDB).

$$MP_i = f(\lambda_i, PDB_i) \quad (5)$$

Since $PDB_i$ is a constant for the given QoS Flow i. But data rate $\beta_i$ is again a function of time. Here function is defines as the:

$$MP_i = PDB_i \times \int_{t1}^{t2} \lambda_i \quad (6)$$

Since t1 and t2 are arbitrary values for continuous calculation of the data rate. Here for our experimentation we have considered T=t2−t1=5 seconds. Above equation becomes $$MP_i = PDB_i \times \int_0^T \lambda_i \quad (7)$$

The migration preference for a call with n QoS flows be MPc and is a function of aggregating the migration preference of its QoS flows.

$$MP_c = \sum_{i=0}^{n} MP_i \quad (8)$$

The higher the MPc, the probability of the call to get selected for the migration will be higher. Let the packet arrival rate for a call c belonging to M: M is the set of all active calls at VNFC v be given by $\lambda_c(v)$. Then $$\lambda_c(v) = \sum_{i=0}^{n} \lambda_i \quad (9)$$

Let Service rate of the VNFC is given by $\mu$. For a stable system $$\mu_v > \sum_{c=0}^{M} \lambda_c(v) \quad (10)$$

and Load Factor $$\tau = \sum_{c=0}^{M} \frac{\lambda_c(v)}{\mu_v}, \ 0 < \tau < 1$$

is a load factor where M is a set of all active calls at VNFC v under consideration.

Let $\tau_{Th}$ be threshold VNFC load factors above which the VNFC would be marked as overloaded triggers for calls to be migrated. We also define the estimated percentage CPU load exerted by call c on VNFC v as $L_c(v)$.

$$L_c(v) = \lambda_c(v)/\mu_v \quad (11)$$

From the definition of (1), that Latency of the call to be migrated has to be minimal is given by:

$$MinPDB_i : \forall_i \in c \ll Latency_i^{Total} \quad (12)$$

VNFC load thresholds $\zeta$ is tuneable parameter and have to be set by the network operator. We say that the system is stable when the above constraint is satisfied. Since packet header processing majorly constitutes the utilized CPU, the load exerted by a call upon a VNFC is roughly dependent on packet arrival rate. Hence the only possible reason that could cause the violation of constraint (8) is the fluctuation in packet arrival rates.

As illustrated in FIG. 7, a graphical representation of VNFC load balancing post call selection method for migration is shown, according to the embodiments as disclosed herein. As shown in FIG. 7, the average load in VNFC is almost near to maximum utilization threshold in fuzzy based call selection compared to other approaches, leading to optimal utilization of VNFC.

FIG. 8 illustrates a graphical representation of VNFC load balancing using FIFO (First In First Out) call selection method for migration, according to the embodiments as disclosed herein.

FIG. 9 illustrates a graphical representation of VNFC load balancing using LIFO (Last In First Out) call selection method for migration, according to the embodiments as disclosed herein.

FIG. 10 illustrates a graphical representation of VNFC load balancing using random call selection method for migration, according to the embodiments as disclosed herein.

As illustrated in FIG. 11, a graphical representation of call selection for migration is shown. FIG. 11 mainly combines calls selected for migration using all the three approaches which are FIFO, LIFO and random call selection where the size denotes the migration preference of each call in VNFC. The bigger size indicates higher preference for migration. It can be seen that PDB is maintained for each call and latency is less. when calls are selected only on the basis of one of the identified call parameters (PDB or data rate), more number of migrations take place as compared to when calls are selected using the proposed inference system. To reveal the relationship between call selection system and the number of migrations, the weight ages given to the truth values of PDB and data rate were varied in the proposed system. Lower number of migrations in the system is always preferred.

FIG. 12A illustrates a graphical representation of membership grades for PDB, according to the embodiments as disclosed herein. The proposed system in the present invention works on a set of IF-THEN implications and is operable in 3 stages:

Fuzzification: The process of signing truth values to atomic propositions or mapping of input values to linguistic classes with an associated truth value is called fuzzification. These truth values are called membership grades. For e.g. the proposition "A data rate of 3 gbps is low" may be given a truth value of 0.35; In other words, 3 gbps data rate has a membership grade of 0.35 in the low set. Similarly, "A data rate of 3 gbps is high" may be given a truth value of 0.1. Implication evaluation: The truth value of each IF-THEN implication is evaluated.

Defuzzification: The consequents of all the IF-THEN implications are aggregated to obtain a crisp output.

FIG. 12A shows selection of triangular membership grades for the proposed system of the present invention. The triangular memberships are fast to compute and easy to interpret. The peaks of these memberships define the value which is most suitable for the given linguistic class. These peak values are called triangular membership grades. Following functions $g_l$; $g_m$; $g_n$ represent the shape of the triangular membership grades for low, medium and high range for data rate.

$$g_l = \frac{a_0 - x}{a_1}, (b_0 < x < b_1) \quad (13)$$

-continued $$g_m = \frac{a_2 - x}{a_3}, (b_2 < x < b_3) \quad (14)$$

$$g_n = \frac{a_4 - x}{a_5}, (b_4 < x < b_5) \quad (15)$$

$$g_h = \frac{a_6 - x}{a_7}, (b_6 < x < b_7) \quad (16)$$

FIG. 12B illustrates a graphical representation of membership grades for data rate, according to the embodiments as disclosed herein. Triangular membership grades are selected for the proposed system of the present invention as shown in FIG. 12B. The values we use in triangular membership grade function for data rate are the following:

[a1, a2, a3, a4, a5, a6, a7, a8]=[44, 2, 3, 8, 3, 6, 4]
[b0, b1, b2, b3, b4, b5, b6, b7]=[0, 4, 2, 5, 5, 8, 6, 10]

when calls are selected only on the basis of one of the identified call parameters (PDB or data rate), more number of migrations take place as compared to when calls are selected using the proposed system of the present invention. Lower number of migrations in the system is always preferred.

FIG. 13 schematically illustrates a Entity according to embodiments of the present disclosure.

The entity 1300 may correspond to base station (e.g., gNB, eNB or BS) and a certain function (or component) in a core network. Also the entity 1300 may comprise at least one of CU or DU.

Also, The Entity 1300 may correspond to CU (Central Unit)s or DU (Distribution Unit)s. For example, the Entity 1300 may correspond to the NG-CU (Next Generation Central Unit) 116 illustrated in above figures. Also, the Entity 1300 may correspond to the NG-DU (Next Generation Distribution Unit) 108 illustrated in above figures.

Furthermore, the entity 1300 illustrated in the FIG. 13 describes an embodiment of the physical component of entity 1300.

Referring to the FIG. 13, the Entity 1300 may include a processor 1310, a transceiver 1320 and a memory 1330. However, all of the illustrated components are not essential. The Entity 1300 may be implemented by more or less components than those illustrated in FIG. 13. In addition, the processor 1310 and the transceiver 1320 and the memory 1330 may be implemented as a single chip according to another embodiment.

The aforementioned components will now be described in detail.

The processor 1310 may include one or more processors or other processing devices that control the proposed function, process, and/or method. Operation of the Entity 1300 may be implemented by the processor 1310.

The transceiver 1320 may include a RF transmitter for up-converting and amplifying a transmitted signal, and a RF receiver for down-converting a frequency of a received signal. However, according to another embodiment, the transceiver 1320 may be implemented by more or less components than those illustrated in components.

The transceiver 1320 may be connected to the processor 1310 and transmit and/or receive a signal. The signal may include control information and data. In addition, the transceiver 1320 may receive the signal through a wireless channel and output the signal to the processor 1310. The transceiver 1320 may transmit a signal output from the processor 1310 through the wireless channel.

The memory 1330 may store the control information or the data included in a signal obtained by the Entity 1300. The memory 1330 may be connected to the processor 1310 and store at least one instruction or a protocol or a parameter for the proposed function, process, and/or method. The memory 1330 may include read-only memory (ROM) and/or random access memory (RAM) and/or hard disk and/or CD-ROM and/or DVD and/or other storage devices.

FIG. 14 illustrates a user equipment (UE) according to embodiments of the present disclosure.

The UEs described above may correspond to the UE 1400. For example, the UEs 106a-106n illustrated in FIG. 1 may correspond to the UE 1400. Also, IoT (Internet of Things) devices 102a-102n illustrated in FIG. 1 may correspond to the UE 1400. Mobile devices 104a-104n illustrated in FIG. 1 may correspond to the UE 1400.

Referring to the FIG. 14, the UE 1400 may include a processor 1410, a transceiver 1420 and a memory 1430. However, all of the illustrated components are not essential. The UE 1400 may be implemented by more or less components than those illustrated in FIG. 14. In addition, the processor 1410 and the transceiver 1420 and the memory 1430 may be implemented as a single chip according to another embodiment.

The aforementioned components will now be described in detail.

The processor 1410 may include one or more processors or other processing devices that control the proposed function, process, and/or method. Operation of the UE 1400 may be implemented by the processor 1410.

The transceiver 1420 may include a RF transmitter for up-converting and amplifying a transmitted signal, and a RF receiver for down-converting a frequency of a received signal. However, according to another embodiment, the transceiver 1420 may be implemented by more or less components than those illustrated in components.

The transceiver 1420 may be connected to the processor 1410 and transmit and/or receive a signal. The signal may include control information and data. In addition, the transceiver 1420 may receive the signal through a wireless channel and output the signal to the processor 1410. The transceiver 1420 may transmit a signal output from the processor 1410 through the wireless channel.

The memory 1430 may store the control information or the data included in a signal obtained by the UE 1400. The memory 1430 may be connected to the processor 1410 and store at least one instruction or a protocol or a parameter for the proposed function, process, and/or method. The memory 1430 may include read-only memory (ROM) and/or random access memory (RAM) and/or hard disk and/or CD-ROM and/or DVD and/or other storage devices.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

The various actions, acts, blocks, steps, or the like in the FIGS. 1A-14 may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for a call selection and migration operation in a central unit (CU) in a wireless communication system, the method comprising:
   assigning a call to a source virtual network function component (VNFC) in the CU;
   detecting whether an overload traffic occurs in the assigned call;
   in case that the overload traffic is detected, selecting, based on a migration preference value, the call to be migrated to a target VNFC in the CU, wherein the selected call corresponds to a call having a higher migration preference value than another call, and wherein the migration preference value is identified based on a value of packet delay budget (PDB) and a data rate associated with the call; and
   migrating, to the target VNFC, the selected call.

2. The method of claim 1, wherein selecting the call comprises:
   identifying a value of quality of service (QoS) flow identifier (ID); and
   generating, based on the value of QoS flow ID, a dynamic priority list associated with the migration preference value.

3. The method of claim 1, wherein the selected call is migrated to a user plane of the target VNFC through at least one general packet radio service tunneling protocol (GTP) tunnel.

4. The method of claim 1, wherein the call comprises at least one signaling radio bearer and at least one data radio bearer that include multiple flows with different QoS requirements.

5. The method of claim 4, wherein the at least one signaling radio bearer and the at least one data radio bearer correspond to GTP tunnels, and wherein the GTP tunnels is identified from a distribution unit (DU) to the CU and then from the CU to a core network.

6. The method of claim 1, wherein the selected call corresponds to a call with higher data rates than the other call assigned to the VNFC in the CU.

7. The method of claim 1, wherein the migration preference value is further identified based on the QoS flows.

8. The method of claim 1, wherein migrating the selected call further comprises:

performing a path switching operation for a plurality of next generation 1-U (NG1-U) interfaces and a plurality of F1-U interfaces.

9. A central unit (CU) for a call selection and migration operation in a wireless communication system, the CU comprising:
 a transceiver; and
 at least one processor coupled to the transceiver and configured to:
  assign, by a control plane of virtual network function component (VNFC), a call to a source VNFC in the CU,
  detect whether an overload traffic occurs in the assigned call,
  in case that the overload traffic is detected, select, based on a migration preference value, by a user plane of the source VNFC, the call to be migrated to a target VNFC in the CU, wherein the selected call corresponds to a call having a higher migration preference value than another call, and wherein the migration preference value is identified based on a value of packet delay budget (PDB) and a data rate associated with the call, and
  migrate, by the control plane of VNFC, the selected call to the target VNFC.

10. The CU of claim 9, wherein the at least one processor is further configured to:
 identify a value of quality of service (QoS) flow identifier (ID), and
 generate, based on the value of QoS flow ID, a dynamic priority list associated with the migration preference value.

11. The CU of claim 9, wherein the selected call is migrated, to the user plane of the target VNFC, through at least one general packet radio service tunneling protocol (GTP) tunnel.

12. The CU of claim 9, wherein the call comprises at least one signaling radio bearer and at least one data radio bearer that include multiple flows with different QoS requirements.

13. The CU of claim 12, wherein the at least one signaling radio bearer and the at least one data radio bearer correspond to GTP tunnels, and wherein the GTP tunnel is identified from a distribution unit (DU) to the CU and then from the CU to a core network.

14. The CU of claim 9, wherein the selected call corresponds to a call with higher data rates than the other call assigned to the VNFC in the CU.

15. The CU of claim 9, wherein the migration preference value is further identified based on the QoS flows.

16. The CU of claim 9, wherein at least one processor is further configured to:
 perform a path switching operation for a plurality of next generation 1-U (NG1-U) interfaces and a plurality of F1-U interfaces.

* * * * *